(12) United States Patent
Jernigan

(10) Patent No.: US 10,529,961 B2
(45) Date of Patent: Jan. 7, 2020

(54) POWER SOURCE FOR FIREARM ACCESSORIES AND METHOD OF USE

(71) Applicant: Dakota Jernigan, Sulphur Springs, TX (US)

(72) Inventor: Dakota Jernigan, Sulphur Springs, TX (US)

( * ) Notice: Subject to any disclaimer, the term of this patent is extended or adjusted under 35 U.S.C. 154(b) by 0 days.

(21) Appl. No.: 16/205,981

(22) Filed: Nov. 30, 2018

(65) Prior Publication Data

US 2019/0165343 A1   May 30, 2019

Related U.S. Application Data

(60) Provisional application No. 62/592,742, filed on Nov. 30, 2017.

(51) Int. Cl.
*H01M 2/10* (2006.01)
*F41G 1/16* (2006.01)
*H02J 7/00* (2006.01)
*F41G 11/00* (2006.01)

(52) U.S. Cl.
CPC .......... *H01M 2/1022* (2013.01); *F41G 1/16* (2013.01); *F41G 11/003* (2013.01); *H01M 2/1094* (2013.01); *H02J 7/0045* (2013.01)

(58) Field of Classification Search
CPC ..... F41G 1/32; F41G 1/34; F41G 1/35; F41G 1/36; F41G 1/16; H01M 2/1022
See application file for complete search history.

(56) References Cited

U.S. PATENT DOCUMENTS

| | | | | |
|---|---|---|---|---|
| 5,822,905 A * | 10/1998 | Teetzel | ..................... | F41C 23/16 42/117 |
| 8,776,422 B2 * | 7/2014 | Dodd | ...................... | F41C 23/22 42/72 |
| 8,875,434 B2 * | 11/2014 | Michal | ..................... | F41C 23/16 42/90 |
| 9,841,259 B2 * | 12/2017 | Phillips | ............... | F41H 13/0031 |
| 2011/0047851 A1 * | 3/2011 | Mock | ...................... | F41C 23/16 42/72 |
| 2016/0165192 A1 * | 6/2016 | Saatchi | .................. | H04N 5/772 386/227 |

FOREIGN PATENT DOCUMENTS

WO    WO-2005074382 A2 *   8/2005   ..........   F21V 33/0064

* cited by examiner

*Primary Examiner* — Stephen Johnson
(74) *Attorney, Agent, or Firm* — Richard Eldredge

(57) ABSTRACT

A mountable power source for powering one or more accessories mounted on a firearm, the mountable power source includes an enclosure having a battery bank disposed therein; an attachment device extending from the enclosure and to secure to a firearm; a charging port for receiving a power supply to charge the battery bank; and power out port to supply power to the one or more accessories.

5 Claims, 6 Drawing Sheets

POWER SOURCE FOR FIREARM ACCESSORIES AND METHOD OF USE

BACKGROUND

1. Field of the Invention

The present invention relates generally to firearms and firearm accessories, and more specifically, to a power source device for powering one or more accessories mounted to a firearm. This application claims domestic priority from U.S. provisional application 62/592,742 as filed on Nov. 30, 2017.

2. Description of Related Art

Firearm and firearm accessories are well known in the art and are effective means of self defense and recreation. For example, FIG. 1 depicts a conventional firearm 101 having a picatinny rail 103, a forward grip 105, a pistol grip 107, and a buttstock 109. During use, one or more accessories, such as cameras and lights, can be secured to picatinny rail 103 as well as at other locations of firearm 101. These accessories can aid in enjoyment and effectiveness of firearm 101.

One of the problems commonly associated with firearm 101 is the inability to power the one or more accessories for extended periods of time. For example, the one or more accessories may include internal batteries that require replacement of the battery or the entire accessory.

Accordingly, although great strides have been made in the area of firearms and firearm accessories, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
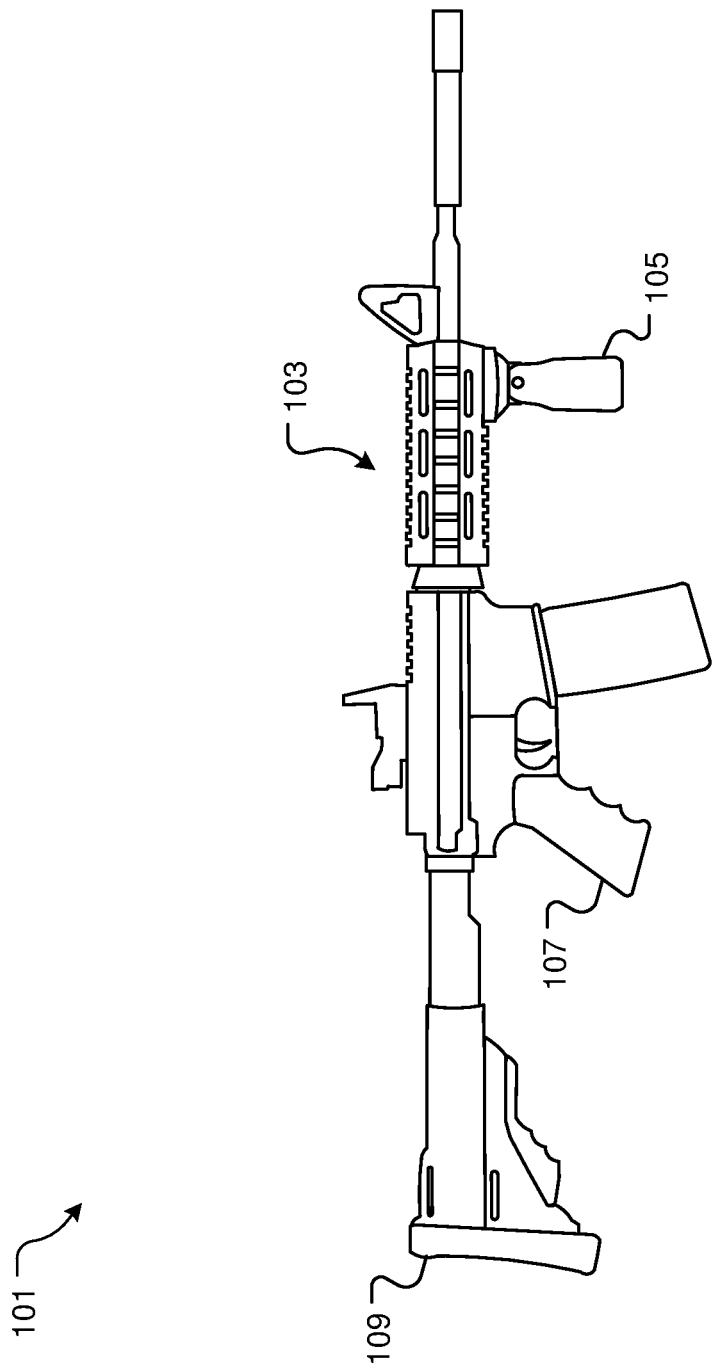
FIG. 1 is a side view of a common firearm.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional firearm systems. Specifically, the present invention provides a means to power one or more accessories secured to a firearm. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Figure 2:
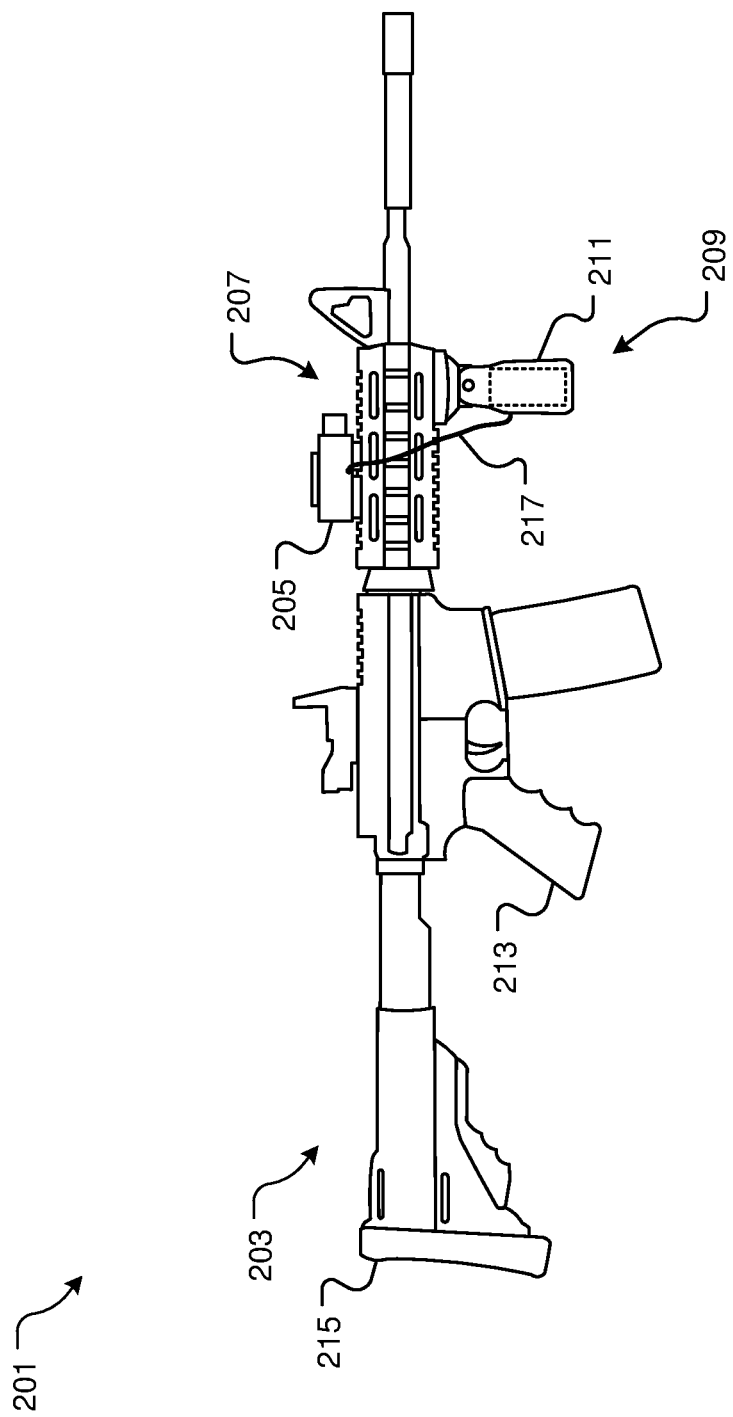
FIG. 2 is a side view of a firearm system in accordance with a preferred embodiment of the present application.

Referring now to the drawings wherein like reference characters identify corresponding or similar elements throughout the several views, FIG. 2 depicts a side view of a firearm system 201 in accordance with a preferred embodiment of the present application. It will be appreciated that system 201 overcomes one or more of the above-listed problems commonly associated with conventional firearm systems.

In the contemplated embodiment, system 201 includes a firearm 203 having one or more accessories 205 secured thereon. In one embodiment, the one or more accessories 205 are secured to a picatinny rail 207, however, it is contemplated that the one or more accessories could be secured at other locations on the firearm. In addition, it should be appreciated that firearm 203 can vary in model, type, size, and features. It should further be understood that the one or more accessories 207 can be any accessory, such as a light, camera, sights, lasers, etc.

System 201 further includes a power source device 209 configured to be secured to firearm 203. In one preferred embodiment, device 209 is incorporated into a forward grip 211 configured to be removably secured to firearm 203. However, other contemplated embodiments include power sources disposed within or configured to be secured to a pistol handle 213 or a buttstock 215. Device 209 is configured to provide power to the one or more accessories 205 via one or more cables/cords 217.

Figures 3A, 3B:
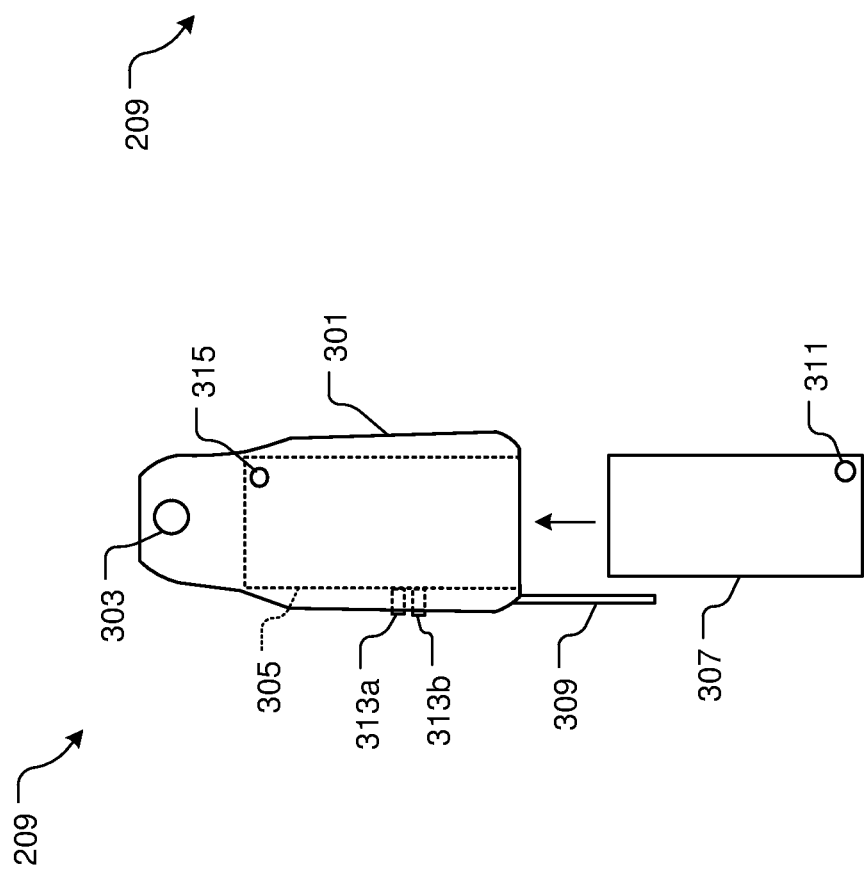
FIGS. 3A and 3B are side views of a power source device from FIG. 2.

In FIGS. 3A and 3B, side views show one contemplated power source device 209. In the preferred embodiment, device 209 includes an enclosure 301 having one or more connection devices 303 configured to secure the enclosure to a structural feature of the firearm. In this embodiment, the connection device 303 is a screw, however, it is contemplated that the connection device could be multiple screws, a picatinny rail attachment device, or other clasps, clips, adhesives, and other means.

Enclosure 301 includes an internal cavity 305 configured to receive a rechargeable battery bank 307. As shown in FIGS. 3A and 3B, it is contemplated having a door 309 to provide access to cavity 305, however, it should be appreciated that alternative means could be used.

Device 209 further includes a charging port 311 configured to receive a charging cable to charge battery bank 309, and one or more outlet ports 313a, 313b configured to connect a cable to one or more accessories, thereby providing the one or more accessories with power. It should be understood that in this embodiment, battery bank 309 can be removed and replaced, or removed and charge for further use. However, other alternative embodiments contemplate battery bank 307 being permanently secured to, or within enclosure 301.

Device 209 can further include a charge identifier 315, such as a light to indicate the power level of bank 309. It should further be appreciated that the battery size and capacity can vary.

It should be appreciated that one of the unique features believed characteristic of the present application is the incorporation of a battery bank into an enclosure, wherein the battery bank includes a charging port and one or more output ports, thereby allowing for the battery bank to be recharged and supply power to one or more accessories.

Figure 4:
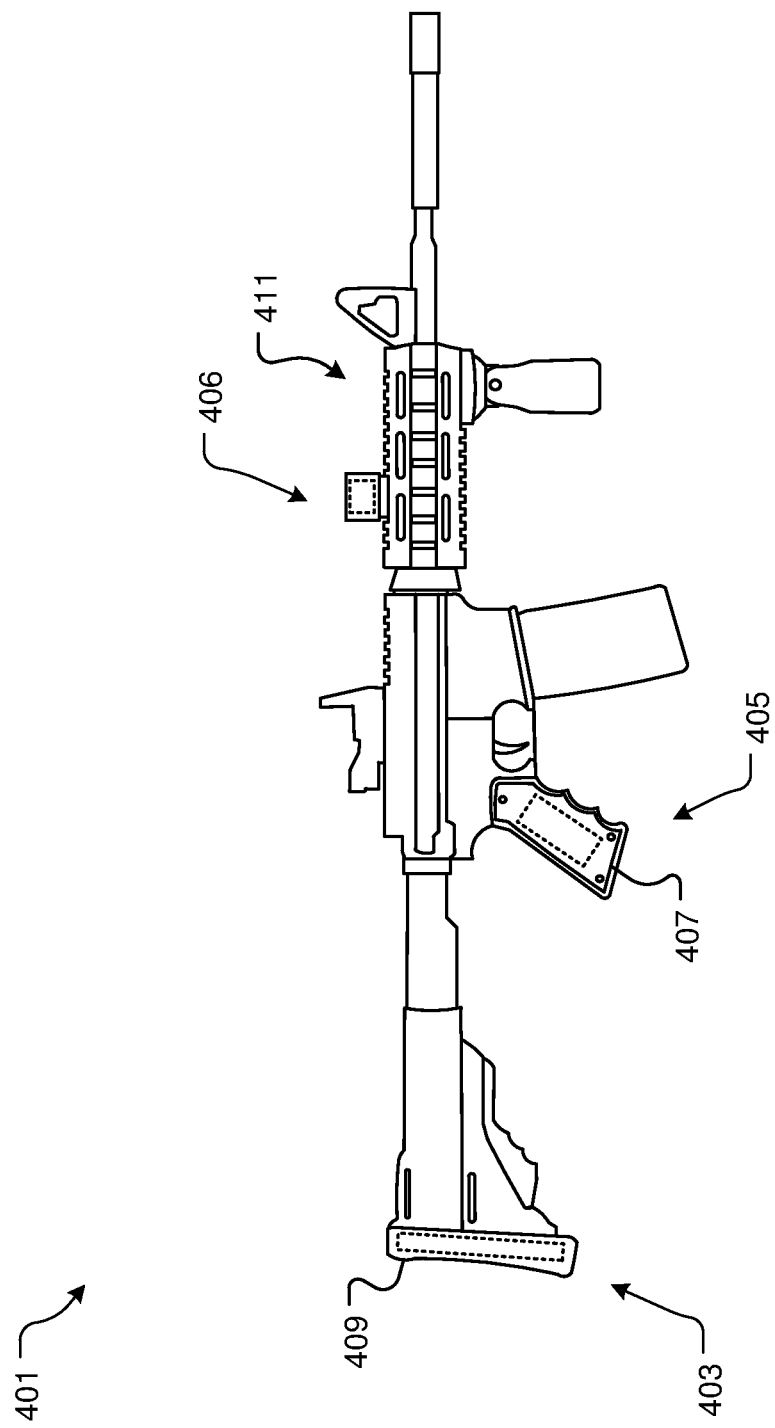
FIG. 4 is a side view of an alternative embodiment of a firearm system in accordance with the present application.

In FIG. 4, a side view of an alternative embodiment of a firearm system 401 is shown, being similar in form and function to system 201. System 401 demonstrates various alternative locations for securing one or more power source devices 403, 405, 406 to a firearm. It should be appreciated that devices 403, 405, 406 are similar to device 209 and can include one or more of the features described above. From this figure, it can be determined that power source devices can be incorporated into or secured to a pistol grip 407, buttstock 409, or rail 411.

Figure 5:
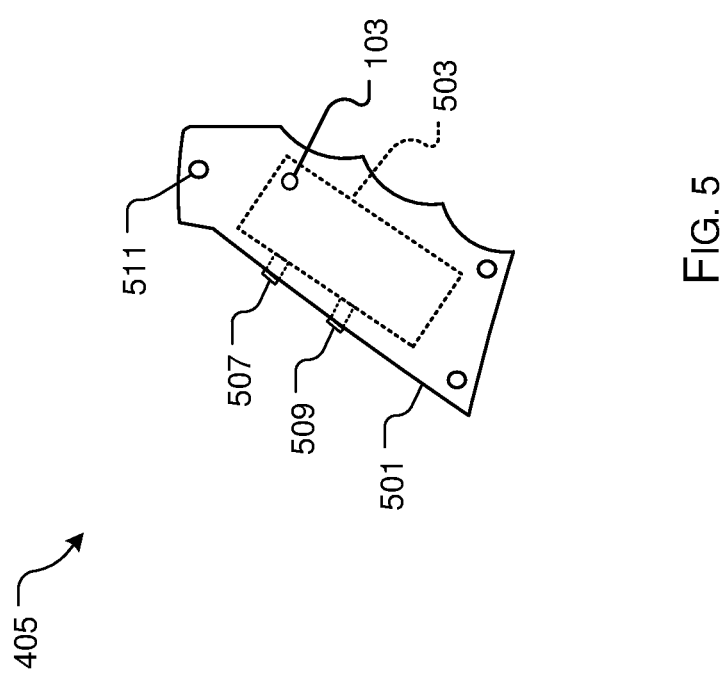
FIG. 5 is a side view of an alternative embodiment of a power source device in accordance with the present invention.

In FIG. 5, a side view shows one embodiment of power source device 405, being incorporated into a pistol grip 501. It is contemplated that a battery bank 503 can be permanently incorporated into grip 501, which is attachable to the pistol handle via one or more screws 505. Device 405 can have a charging port 507 and one or more power out ports 509, as well as a power level indicator 511.

Figure 6:
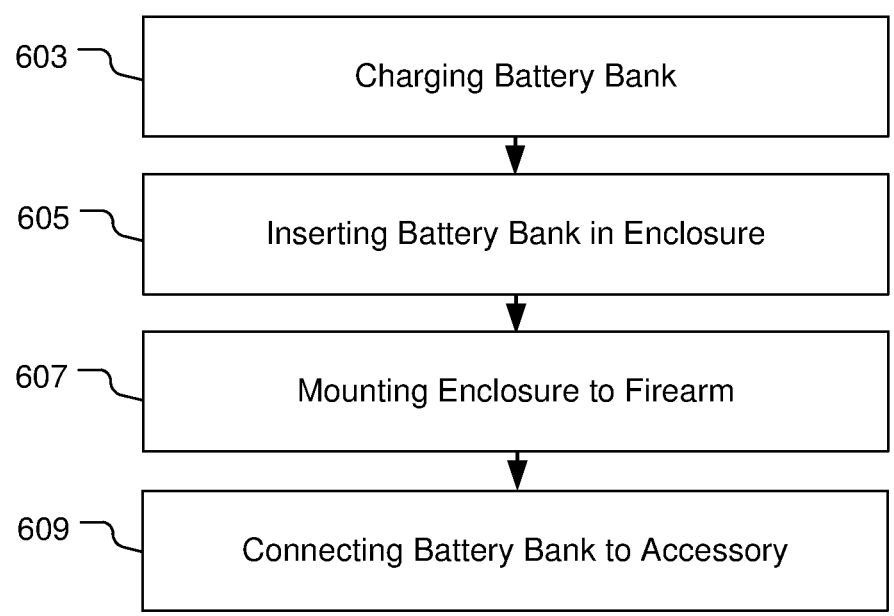
FIG. 6 is a flowchart of the method of use of the system of FIG. 2.

In FIG. 6, a flowchart 601 depicts a method of use of system 201 and system 401. During use, the battery bank is charged via the charging port and a cable, as shown with box 603. The battery bank is then either inserted into the enclosure (for system 201), or alternatively, the battery bank is already permanently secured within the enclosure, as shown with box 605. The enclosure is mounted to the firearm, wherein the power device can then provide power for one or more accessories, as shown with boxes 607, 609.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A mountable power source for powering one or more accessories mounted on a firearm, the mountable power source comprising:
   a body extending from a first end to a second end and forming an enclosure;
   a door pivotally attached to the first end of the body and configured to open and close access to the enclosure;
   a removable battery bank configured to fit within the enclosure;
   an attachment device extending from the second end of the body and configured to removably secure to a firearm;
   a charging port extending to an outer surface of the body, the charging port is conductively coupled to the removable battery bank and configured to provide access to a power supply to charge the battery bank; and
   a power out port configured to supply power to the one or more accessories;
   wherein the body is removable attached to the firearm via the attachment device.

2. The mountable power source of claim 1, wherein the body is a forward grip.

3. The mountable power source of claim 1, wherein the attachment device is configured to secure to a picatinny rail of the firearm.

4. The mountable power source of claim 1, further comprising:
   a second power out port for providing power to the one or more accessories.

5. The mountable power source of claim 1, wherein the body is composed of a waterproof material.

* * * * *